United States Patent [19]

Meyer et al.

[11] Patent Number: 5,144,130
[45] Date of Patent: Sep. 1, 1992

[54] METHOD FOR THE ELECTRICAL ADJUSTMENT OF AN OPTICAL ROW OF SENSORS

[75] Inventors: Urs Meyer, Niederglatt; Rene F. Oberhaensli, Wiesendangen; Dominik Haeusler, Unterageri, all of Switzerland

[73] Assignee: Rieter Machine Works Limited, Winterthur, Switzerland

[21] Appl. No.: 568,515

[22] Filed: Aug. 16, 1990

Related U.S. Application Data

[63] Continuation-in-part of Ser. No. 480,205, Feb. 14, 1990.

[30] Foreign Application Priority Data

Feb. 16, 1989 [CH] Switzerland ............... 538/89
Feb. 16, 1990 [EP] European Pat. Off. ........ 90103072.6

[51] Int. Cl.$^5$ .............................................. G05B 1/00
[52] U.S. Cl. ..................................... 250/202; 180/167
[58] Field of Search ............... 250/202, 214 R, 208.2, 250/208.3, 208.4, 214 B; 318/577; 180/167, 168, 169

[56] References Cited

U.S. PATENT DOCUMENTS

| | | |
|---|---|---|
| 3,881,568 | 5/1975 | Ando et al. |
| 4,003,445 | 1/1977 | De Bruine |
| 4,694,153 | 9/1987 | Bejczy et al. ............ 250/202 |
| 4,703,240 | 10/1987 | Yoshimoto et al. |
| 4,703,820 | 11/1987 | Reinaud |
| 4,775,023 | 10/1988 | Shimada et al. |
| 4,777,601 | 10/1988 | Boegli |

FOREIGN PATENT DOCUMENTS

| | | |
|---|---|---|
| 0195191 | 9/1986 | European Pat. Off. |
| 3715025 | 11/1987 | Fed. Rep. of Germany |

OTHER PUBLICATIONS

IBM Technical Disclosure Bulletin, vol. 29, No. 9, page 4189, Feb. 1987, entitled "Self-Adjusting Analog Toner Patch Sensor".

"Ground Reflectance Measurement Techniques: A Comparison", authored by M. Duggin et al. Applied Optics, vol. 22, No. 23, Dec. 1, 1983, New York, NY pp. 3771–3777.

"Fahrerlose Flurforderzeuge –Hilfen auf dem Wege zur Automatisierung" (translated as Driverless Floor Transport Vehicles-Resources on the Way to Automation) by P. Gunsser in Textil Praxis International 1984, vol. 7, pp. 661–664.

"Neue Systeme zur Steuerung von Flurforderzeugen" (translated as New Systems for Controlling Floor Vehicles) by Hartmut Jorichs in Technische Rundschau, vol. 1/89, pp. 34 through 39, 1989.

*Primary Examiner*—David C. Nelms
*Attorney, Agent, or Firm*—Sandler, Greenblum & Bernstein

[57] ABSTRACT

There is disclosed a method for the adjustment of an optical row of sensors which, for guiding a driverless vehicle along an optical guideway, is secured at the vehicle transversly with respect to the vehicle travel direction. Known systems attempt to accomplish a compensation of component tolerances by carrying out an adjustment between the measurement signals of the sensors. However, this leads to inaccurate measurement values. A post-adjustment of a contrast value is not contemplated with these systems. The invention eliminates these inaccuracies and affords an exact post-adjustment. On the one hand, this is attained in that the sensors are adjusted by a calibration surface and the adjustment values for controlling the sensors are stored in an adjustment table. On the other hand, it is proposed to perform the adjustment operation at the site of use of the equipment and to provide an adaptive post-adjustment of the thus set adjustment table.

23 Claims, 4 Drawing Sheets

Fig-6

# METHOD FOR THE ELECTRICAL ADJUSTMENT OF AN OPTICAL ROW OF SENSORS

CROSS REFERENCE TO RELATED APPLICATION

This application is a continuation-in-part application of U.S. application Ser. No. 07/480,205, filed Feb. 14, 1990 and entitled "Method of and Apparatus for Guiding a Self-Steering Vehicle Along an Optical Guideway," the disclosure of which is expressly incorporated by reference in its entirety herein.

BACKGROUND OF THE INVENTION

1. Field of the Invention

The present invention relates to a new and improved method for the adjustment of an optical row of sensors.

In its more particular aspects, the invention relates to a method for the adjustment or compensation of an optical row of sensors which, for the purpose of guiding a self-propelled or driverless vehicle along an optical guideway or track, is attached at the vehicle in a direction substantially transverse to the direction of vehicle travel. The scanning operation as far as the number of sensors is concerned is accomplished with a timewise delay, and the measurement signals are evaluated by means of a subsequently connected computer serve to control a steering mechanism.

2. Description of Background and Other Information

The use of optical sensors for guiding a self-propelled or driverless vehicle, and which optical sensors scan an optical guideway or guide track or strip applied to a floor or base surface, has been found to be exceedingly advantageous. This is particularly the case because the mounting of a guideway or track upon the floor or base surface can be accomplished without any great problems and there is not required any post-treatment of such floor or base surface as would be otherwise required when laying a metallic guide wire. Hence, such type of installation can be installed without any problems in already existing buildings or structures which are equipped with traveling vehicles.

In U.S. Pat. No. 4,703,240, granted Oct. 27, 1987, there is disclosed such a scanning apparatus, wherein a row of optical sensors scan a guide track mounted at a floor. The thus obtained signals are weighted based upon a threshold value, and thus, the position of the guide track or strip is determined based upon the distribution of the signals as viewed over the width of the sensor arrangement. If the guide track or strip is arranged off-center, then there is controlled a vehicle steering mechanism. In order to compensate different tolerances of the individual sensors, there is proposed that the determined measurement values of neighboring or plural sensors are compared with one another in order to thus obtain a smoothed measurement value curve. As a result, it is indeed possible to compensate in part tolerances, but on the other hand, this smoothing operation leads to inaccuracies, particularly at the region between the interface of the floor and the guide strip and thus to deviations in maintaining travel along the guide track.

A further optical sensor apparatus is known to the art from U.S. Pat. No. 4,775,023, granted Oct. 4, 1988. In this arrangement, and viewed over the row of sensors, each second sensor is alternatingly controlled or powered such that the transmitted light cones do not intersect and are not able to mutually disturb one another. The evaluation of the signals likewise is correlated to a predetermined threshold value and results in a binary value 0 or 1 corresponding to the signal. These binary values are weighted to an average or mean value and cause the generation of an appropriate control signal for a steering apparatus. There is not contemplated an adjustment or tuning of the sensors with respect to one another, with the result that the existence of spurious or faulty signals due to the presence of markedly drifting sensors is possible.

However, in actual practice, it has been found that maintaining an exact travel track or path, particularly at the delivery and receiving locations for the vehicles, is necessary and there must be ensured maintaining of the travel path over the guideway or strips.

It is therefore necessary that the measurement signals generated by the sensors are solely dependent upon the scanning operation and specifically the position of the guide track or strip and that further influences, such as for example component tolerances of the sensors, do not influence the measurement signals.

Also, with the aforementioned state of the art, there is not contemplated any post-regulation of the optical scanning system upon impairment of the light reflection from the floor and the guide strips.

However, such is necessary, particularly when the system is in operation over longer periods of time without supervision.

SUMMARY OF THE INVENTION

It is therefore an important object of the present invention to provide an improved method of adjusting or balancing an optical sensor row which serves to guide a driverless vehicle along an optical guideway or strip, so that there are not encountered the aforementioned drawbacks and shortcomings.

Another significant object of the invention aims at avoiding the aforementioned limitations of the state of the art systems and to improve upon the optical guide apparatus.

To implement these and still further objects of the invention, which will become more readily apparent as the description proceeds, the method aspects of the present development, among other things, are manifested by the features that all of the sensors, prior to being placed into operation, are adjusted at a so-called "master surface" or "standard surface" defining a calibration surface, and the adjustment values are stored in an adjustment table.

In the context of this disclosure, the terms "master surface" or "standard surface" are intended to designate a uniform colored surface, as viewed over the adjustment or balancing surface, and to contain a uniform roughness depth. Consequently, each sensor, during the adjustment or balancing operation, is confronted with the same light reflection conditions.

The adjustment or compensation values can be stored in an appropriately set potentiometer or in a PROM of a computer. Since, as a general rule, this first adjustment operation is accomplished at the place of manufacture, it is possible to exchange sensors which cannot be adjusted to a predeterminate value against other sensors.

During this initial adjustment operation, the sensors are essentially adjusted for brightness, that is to say, during the transmission of a certain light pulse, there must be obtained a certain measurement value or reflection value. During this initial adjustment operation, there can also be simultaneously adjusted the slope or steepness of the measurement value curve of the individual sensors. This can be particularly realized by the adjustment or control of the amplifier stages of the individual sensors. The slope of this curve constitutes a measure for the contrast.

In order to regulate the slope of this curve, it is advantageous if the adjustment is undertaken with regard to more than a single measurement value.

The scattering between individual sensors amounts, in part, up to as much as 50%, so that there is absolutely required an adjustment between the individual sensors.

The adjustment operation is automatically accomplished by a suitable computer program of a computer.

Since, at the site of deployment of the installation, because of the properties of the floor, there can partially prevail completely different conditions in terms of the reflection capability than during adjustment or balancing at a master surface. It is additionally proposed that the sensors again be adjusted for brightness directly at the floor surface of the place of utilization.

Due to existing floor irregularities, it is also proposed that the adjustment operation be carried out dynamically, that is to say, the sensor row is shifted through a short path of displacement during the adjustment operation and the thus obtained adjustment values are transmitted and stored in a fixed or temporary adjustment table. It is, however, possible to also perform the adjustment operation statically.

For the exact determination of the transition between the floor surface and the guideway or track or strip, the entire sensor row is adjusted or tuned to a contrast value X. This value X is formed from the mean or average value of the measurement values of the sensors, less the minimum value of a sensor, that is to say, the minimum value is delivered by the sensors which are located over the guide track or strip.

The thus determined adjustment or compensation values are stored in a further-adjustment or compensation table or there is corrected the adjustment table which is temporarily formed during the adjustment operation over the floor surface.

In order to compensate for an impairment of the guideway or strip or the floor covering, for instance by virtue of wear and soiling, it is advantageous to accomplish the adjustment or compensation operation, particularly with regard to contrast, continuously during the vehicle travel.

Consequently, there is ensured, on the one hand, a positive guidance and there is prevented a premature malfunction or crash or a required standstill of the guide apparatus. In order to provide for the system or, as the case may be, an operator, at an early point in time, a warning concerning impairment of the guideway or guide track, it is advantageous to store the changes in the adjustment or compensation table and to evaluate such as well as to transmit the same to a central display.

When there has been reached a certain boundary or threshold value then, there can be triggered different stages of warning functions. If there is interlinked the transmission of the changes of the guideway with the momentary travel path, then it is possible to indicate to the operator, for instance at an optical display, exactly the location at which, owing to an increased impairment of the guideway or guide track, there can be initiated measures for eliminating the same.

It is also possible to adjust or compensate a change in the signal intensity or magnitude by altering the computation rules for the evaluation electronics of a subsequently connected computer or computer unit.

As concerns the heretofore mentioned adjustments of the sensors, and this is particularly the case during the initial or incipient adjustment, there are also adjusted or compensated the elements connected with the sensors.

BRIEF DESCRIPTION OF THE DRAWINGS

The above and additional objects, characteristics, and advantages of the present invention will become apparent in the following detailed description of preferred embodiments, with reference to the accompanying drawings which are presented as non-limiting examples, in which.

DETAILED DESCRIPTION OF PREFERRED EMBODIMENTS

Describing now the drawings, it is to be understood that to simplify the showing thereof, only enough of the construction of the exemplary embodiments of apparatus for guiding self-steering or driverless vehicles along an optical guideway or track or strip has been illustrated therein as needed to enable one skilled in the art to readily understand the underlying principals and concepts of this invention.

Figure 1:
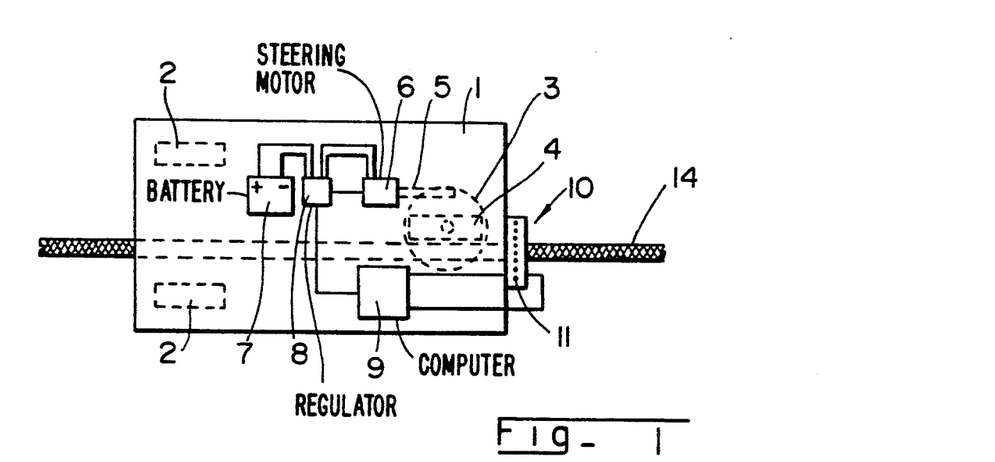
FIG. 1 is a top plan view of a driverless vehicle equipped with the optical guideway or guide track scanning apparatus.

Turning attention now specifically to FIG. 1 of the drawings, a vehicle 1 illustrated therein by way of example and not limitation, will be seen to comprise two non-steerable wheels 2 and one steerable wheel 4 which is pivotable by means of a slewing ring or rotary rim 3. This slewing ring or rotary rim 3 is provided with a not particularly illustrated toothed ring with which there engages a suitable worm shaft 5 of a steering or adjustment motor 6. The steering or adjustment motor 6 receives its electrical energy from a battery 7 and is controlled by a regulator or control unit 8.

This regulator 8 receives respective regulation pulses by means of a computer 9 which is connected with an optical scanning element or arrangement 10. The optical scanning element or arrangement 10, as best seen by referring to FIG. 2, comprises sensors 11 which are formed in each case of a transmitter S, such as a light emission diode, and a receiver E, such as a photo diode. The sensors 11 scan an optical guideway or guide track or strip 14 which is applied to the floor or base surface 50. In the illustrated exemplary embodiment, for instance, eight sensors 11 are arranged in a row adjacent one another transversely with respect to the optical guideway or guide track 14. The drive of the vehicle 1 is accomplished by any suitable and therefore not particularly illustrated drive motor and is effected by means of the two non-steerable wheels 2 or by means of the single steerable wheel 4.

Figure 2:
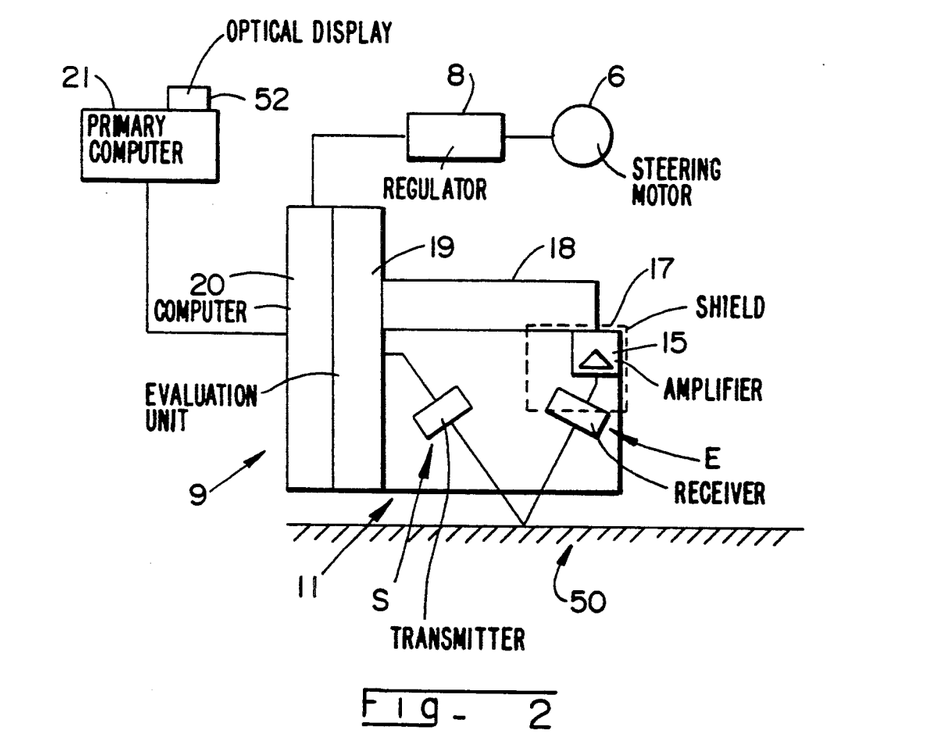
FIG. 2 is an enlarged side view of the guide track-scanning apparatus according to FIG. 1.

FIG. 2 illustrates a schematic arrangement of the transmitters S and the receivers E, each receiver E having connected thereafter an amplifier 15 for amplifying the arriving signals. The sensors 11 are accommodated in a housing which is open in the direction of the floor 50. In order to screen off spurious effects, particularly at the region of the transmitters, the amplifiers 15 are provided with an additional screen or shield 17. The amplified signals are delivered by the line or conductor 18 to an evaluation stage or unit 19 and transformed signals are delivered to a computer 20 which evaluates the signals and predicated upon such evaluation, produces an output signal for the control of the regulator 8.

A primary or controlling computer 21 comprises a host computer provided for the computer 9. By means of this host computer 21, the computer 9 receives instructions which relate to a given driving order or mission. This is particularly important for the evaluation stage or unit 19, and at the region of turnouts or switches and intersections there is necessitated a different evaluation of the determined measurement values, that is to say, there is utilized a different computational rule. Equally, there is transmitted to the host computer 21 certain evaluation results, especially the operating state of the sensors 11 as well as the state of the guideway or track 14, with the result that the host computer 21 can undertake appropriate interventions at the vehicle drive which it controls. Additionally, there can be provided at the host computer 21 an optical display device 52 for an operator.

The sensors 11, the evaluation stage or unit 19 and the computer or computer unit 20 are directly connectable with one another by means of not particularly shown but conventional plug connections, resulting in a compact and simple construction.

Based upon the schematic block circuit diagram of FIG. 3, there will now be explained in greater detail the method for scanning the optical guideway or guide track or strip 14.

Before it is possible to begin with the actual scanning of the guideway or track 14, the sensors 11 and respectively the transmitters S1-S8 and the receivers E1-E8 are adjusted or balanced to a predetermined value with respect to one another by means of a master or standard surface, i.e., a calibration surface. The adjustment operation occurs in the following manner:

By referring to FIG. 3, it will be understood that the constant voltage delivered by an energy source 12 is applied to a converter, for instance a digital-to-analog converter 13 which can be controlled by the computer unit or computer 20 via the line 58 and in accordance with the control operation delivers an adjustment voltage to a subsequently connected transmit-multiplexer 22. This transmit-multiplexer 22, which likewise is controlled by the computer unit or computer 20 via line 54, has the task of delivering the adjustment voltage outputted by a voltage applying section of the converter 13 to one of the current driver stages T1 to T8 of the sensors 11 in accordance with a predetermined switching sequence. The current driver stages T1 to T8 are successively operated by the transmit-multiplexer 22.

If, for instance, an adjustment voltage is applied to the current driver stage T1, then the light pulse initialized by this current driver stage T1 is delivered, for instance as an infrared pulse by means of the transmitter S1 in the direction of a reflection surface. The reflected light pulse is received by the receiver E1, transformed or converted into an electrical magnitude and amplified by means of the associated amplifier 15.

The thus amplified reporting or communication pulse is further delivered to a receive-multiplexer 23. This receive-multiplexer 23 possesses the reverse function from that of the transmit-multiplexer 22. The through-connection from the receiver E1 to the output line or path 24 and controlled by the computer unit or computer 20 via the line 56 renders possible the further delivery of the signal in the form of communication or reporting pulses to the evaluation stage 19. This evaluation stage 19 comprises a NAND-element or gate 25, at the input side of which there is connected, on the one hand, the output line 24 and, on the other hand, the output line or path 26 of a pulse generator 27. This pulse generator 27 transmits a continuous pulse sequence of, for instance, 4 MHz. The pulses which are transmitted from the output line 24 through the NAND-element or gate 25 during a pulse width of the pulse delivered by the pulse generator 27 are counted by a pulse width measuring device 28, transformed and delivered in the form of a digital signal via the line or conductor 29 to a measurement value or look-up table 30 of the computer unit or computer 20. This operation is accomplished for each of the eight sensors in succession.

The converter 13 adjusts itself for each individual sensor 11 until all of the measurement values MW1 to MW8 of the measurement value table 30 exhibit the sam predetermined value. A prerequisite for the adjustment or compensation is that the sensors 11, during the adjustment operation, are aligned with a reflection surface which is essentially uniform over the entire width of the sensors The adjustment values determined by the converter 13 are stored for each sensor in a so-called adjustment or compensation table 31 with the adjustment values AW1 through AW8.

The adjustment operation occurs in extremely brief time intervals since the sensors 11 successively transmit and receive up to 10,000 light pulses per second. The sensors 11 preferably transmit at least 5000 light pulses per second.

Since the determination of the adjustment values AW1 to AW8 is accomplished by the same elements, as is also the case for the evaluation of the measurement values during travel along the optical guideway or track, all of the tolerances of the components or of the entire system are compensated with the adjustment values.

This first adjustment operation is only undertaken once upon placement into operation of the sensors or later only in the event of repairs or exchange of components.

By virtue of the automatic adjustment or compensation operation, there are particularly determined and compensated the component tolerances of the individual reflex scanners. The manufacturing tolerances with respect to different radiation intensities of the transmitters or transmitting diodes S1 to S8 and the different sensitivities of the receiving elements or receivers E1 to E8 are to some extent very large and can be compensated in a simple and non-problematic fashion by virtue of the automatic adjustment operation.

Following this first adjustment operation, there is undertaken the same adjustment over the floor at the location of use of the system, in order to particularly accommodate the sensors to the different reflection capability of the floor, that is to say, the row of sensors is adjusted or compensated with respect to "brightness". Since as a general rule, this floor at the site of use of the system is not uniformly planar or flat, it is recommended to undertake a dynamic adjustment or compensation operation.

Figure 6:
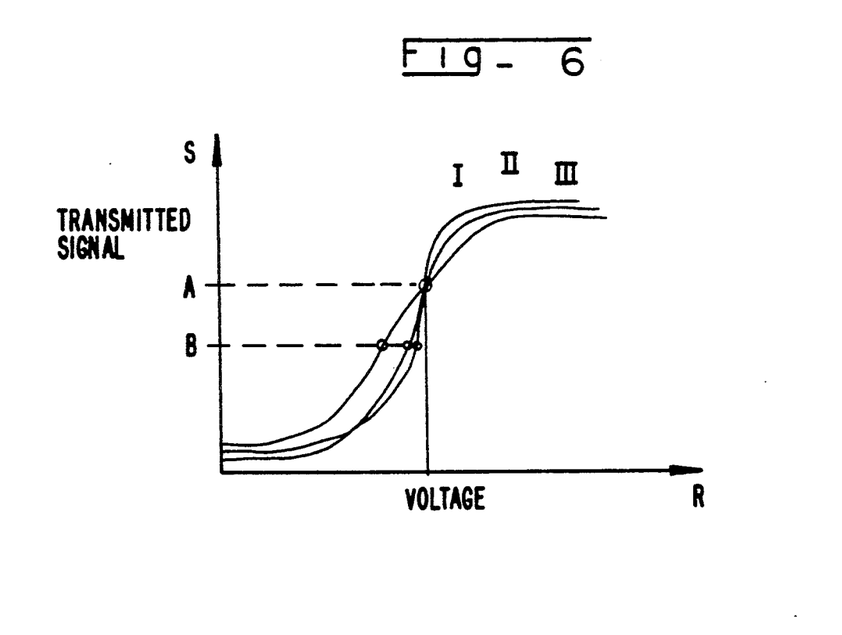
FIG. 6 illustrates an adjustment or compensation curve of the sensors.

As will be particularly evident by referring to FIG. 6, in the case of a lesser reflection, the previously adjusted value can shift from location A to location B, with the result that at that location the individual curves I, II and III, which only have been selected as a representative selection of the eight sensors, no longer are coincident.

It is thus necessary to again have these curves intersect at an intersection point in order to obtain for all of the sensors a uniform starting basis. This can be accomplished by altering the light intensity at the transmitter or by shifting the curves by altering the gain of the signals obtained at the relevant receiver.

The value R plotted along the abscissa could be, for instance, a measure for the voltage with which the transmitter diode of the transmitter is impinged. The value S, in this graph illustration, designates the transmitted signal.

Figure 4:
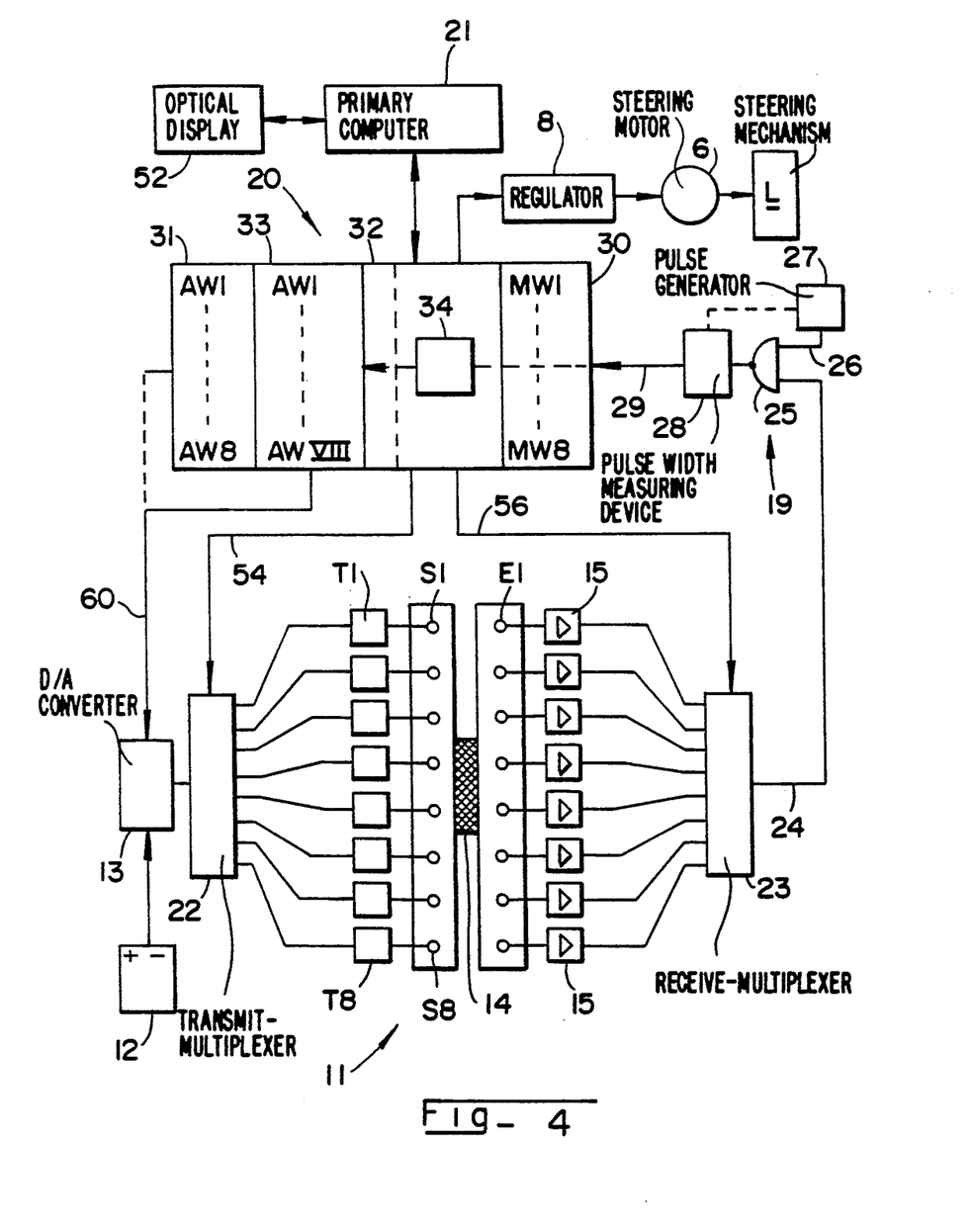
FIG. 4 is a further schematic block circuit diagram according to FIG. 2.

The values determined during this adjustment operation are stored in an adjustment table 32 which has been schematically indicated in FIG. 4.

FIG. 6 shows the course of the curves throughout the width of the sensor row.

Figure 5:
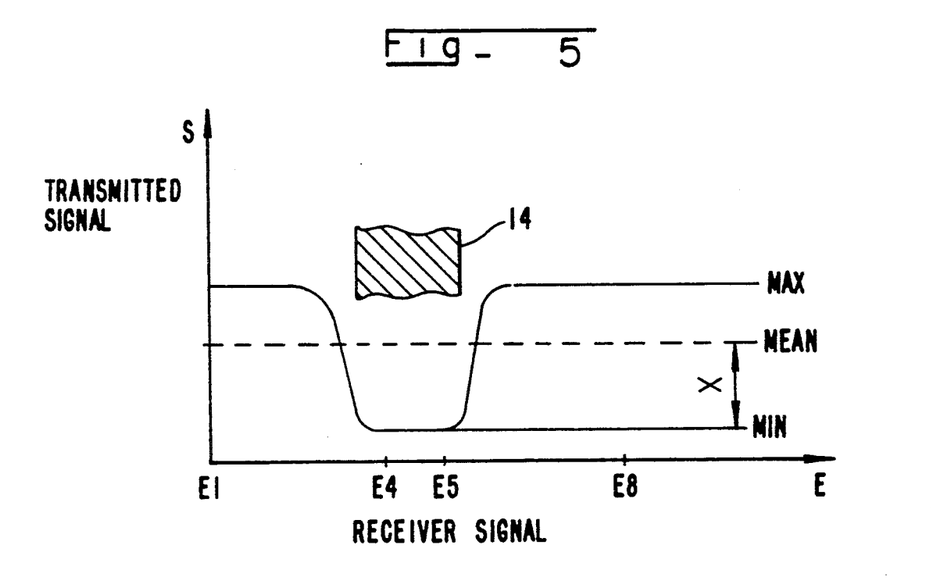
FIG. 5 illustrates a measurement value row throughout the sensor width.

Prior to placing into operation or use of the vehicle, there is required undertaking a further adjustment or compensation operation, particularly with respect to "contrast". As will be seen by inspecting FIG. 5, this contrast X constitutes a measure of the minimal measurement value "MIN" with respect to the average or mean value "MEAN" which results from the average or mean of all of the measurement values MW1 to MW8.

A minimal or minimum value X must be maintained so that it is even possible to recognize or detect the guideway or guide track or strip 14.

The sensors 11 are adjusted or compensated to a predetermined value X throughout the entire row of sensors by virtue of accomplishing a uniform post-regulation based upon the adjustment table 32. Moreover, predicated upon this adjustment operation, there is produced a new adjustment table 33 (FIG. 4) which is temporarily employed and during the vehicle travel operation is accommodated to the conditions of the guideway or guide track. The embodiment of FIG. 4 is essentially like the embodiment of FIG. 3, there only having been additionally undertaken the further adjustment or compensation operation and the further adjustment or compensation tables 32 and 33 including a damping element 34. A further difference resides in the fact that the transmit-multiplexer 22 is directly controlled by means of the temporary adjustment or compensation table 33.

In order to filter out brief disturbances occurring because of contaminants and the like, it is conceivable to incorporate the damping element 34, for instance a low-pass filter between the line or path to the adjustment table 33.

The control of the vehicle along the guideway or guide track is accomplished in the following manner:

As described previously during the adjustment operation, the current driver stages T1 to T8 are impinged by means of the transmit-multiplexer 22, controlled by the computer 20 via the line 54, with a voltage generated by the digital-to-analog converter 13 in accordance with the respective adjustment values AWI to AWVIII, as shown in FIG. 4, inputted by the line 60. As in the aforementioned adjustment operation, the pulses which are delivered via the receivers E1 to E8, the amplifiers or amplifier stages 15 and the receive-multiplexer 23 arrive by means of the output line or path 24 at the evaluation stage or unit 19. The pulses determined in the evaluation stage 19 arrive at the measurement value or look-up table 30. The thus resulting contrast value X is further transmitted by means of the damping element 34 (FIG. 4) for adjustment at the adjustment or compensation table 33. In the illustrated exemplary embodiment of FIG. 3, the guideway or guide track 14 is located exactly at the center of the receivers E1 to E8. This means that the receivers E4 and E5 do not receive any or only very little light reflections from the transmitters S4 and S5. In the computer or computer unit 20 there is now evaluated the measurement value table 30, that is to say, the values MW1 to MW4 and MW5 to MW8 are added and summarily compared. If the sum of the measurement values MW1 to MW4 and the sum of the measurement values MW5 to MW8 are substantially equal to one another, then the optical scanning element 10 and thus the vehicle are in an optimum travel position. In other words, the computer unit or computer 20 transmits no control pulse or signal to the control unit or regulator 8.

Figure 3:
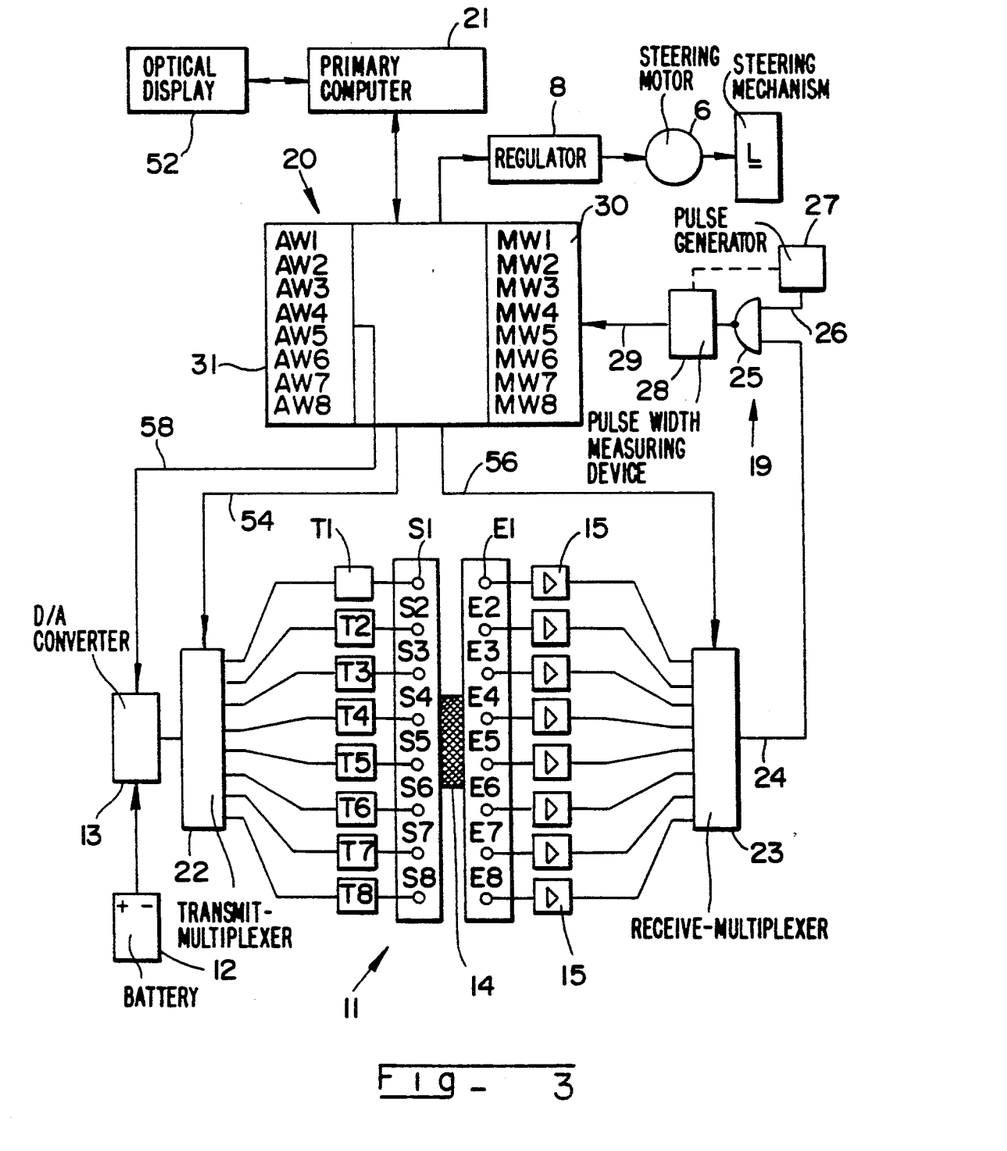
FIG. 3 is a schematic block circuit diagram of the guide track scanning or determination apparatus according to FIG. 2.

In the event of a change in the travel direction, or if the position of the optical guideway or track 14 has shifted in the illustrated embodiment of FIG. 3 towards the sensor S1, E1, then there is present a change in the determined measurement values M1 to M4 with respect to the sum of the measurement values M5 to M8. By virtue of this proportional change of the sums of the measurement values, the computer unit 20 transmits, for the purpose of arriving at a balanced summation relationship, in accordance with the change an analog signal to the regulator 8. This regulator 8 controls the steering motor 6 which adjusts the steering mechanism L, in the exemplary embodiment of FIG. 1, by means of worm shaft 5 and rotary rim 3. This adjustment is effected until the measurement value determination is balanced with respect to the sums of the two halves of the row of sensors 11.

The computer unit or computer 20 is controlled by the primary or controlling host computer 21. This is particularly necessary when the vehicle approaches intersections or switches or turnouts of the optical guideway or track 14. At the region of the turnouts and intersections, and as already described, the determined measurement values MW1 to MW8 are evaluated with another evaluation basis or rule.

The exemplary embodiment possesses only eight sensors throughout the sensor row or width. In order to increase the scanning accuracy, it is advantageous to use more than eight sensors.

Due to the use of an analog scanning and a digital evaluation with exact adjustment or compensation of the sensors for scanning the guideway or guide track, the system is capable of realizing an exact control, whereby a certain irregularity of the guideway or track or line 14 as well as short-term occurring dirt or soiling of the floor are substantially compensated.

It is contemplated that upon switching-off the control apparatus or stopping the traveling vehicle, the temporary adjustment tables 32 and 33 are extinguished and upon again switching-on the system and the traveling vehicle, there is only still active the adjustment or compensation table 31 which has been adjusted at the master or standard surface.

This results in a certain security, especially when the vehicle is then placed into operation at a locality where there are present other conditions. At that location, it is then possible for the system to be again adjusted with the corresponding and previously described adjustment operation. The values of the adjustment table 32 can also remain present as control values of the adjustment values of the adjustment table 33 which are adjusted for contrast, that is to say, if as a result of a pronounced decreasing contrast, the readjustment of the sensor row becomes too great then by comparison with the original measurement values, there can be triggered a warning function.

While there are shown and described present preferred embodiments of the invention, it is to be distinctly understood that the invention is not limited thereto, by may be otherwise variously embodied and practiced within the scope of the following claims.

What is claimed is:

1. A method for the adjustment of a row of optical sensors used for guiding a driverless vehicle along an optical guideway and secured transversely with respect to the direction of travel of the vehicle, comprising the steps of:

prior to scanning of the optical guideway by means of the row of sensors, electrically adjusting the row of sensors to at least a predetermined measurement value at a substantially uniform calibration surface, the surface being spaced from the row of sensors for reflecting light impulses from the row of sensors;

obtaining an adjustment value for each of the sensors, during the step of adjusting, for producing the predetermined measurement value for each of the sensors; and storing said adjustment values, obtained during the adjustment of each individual sensor, in an adjustment table.

2. The method as defined in claim 1, further including the steps of:

statically electrically adjusting the sensors at a floor surface located at the site of use of the vehicle to at least one predetermined value; and storing adjustment values obtained during the adjustment of the sensors in an additional adjustment table.

3. The method as defined in claim 2, wherein:

said additional adjustment table constitutes a fixed adjustment table.

4. The method as defined in claim 2, wherein:

said additional adjustment table constitutes a temporary adjustment table.

5. The method as defined in claim 1, further including the steps of:

dynamically adjusting the sensors to at least one predetermined value at a floor surface located at the site of use of the vehicle; and storing adjustment values obtained during the adjustment of the sensors in at least one of (i) said adjustment table and (ii) an additional adjustment table.

6. The method as defined in claim 5, wherein:

said one of (i) said adjustment table and (ii) an additional adjustment table comprises a fixed adjustment table.

7. The method as defined in claim 5, wherein:

said one of (i) said adjustment table and (ii) an additional adjustment table comprises a temporary adjustment table.

8. The method as defined in claim 1, further including the steps of:

electrically adjusting the sensors to at least one predetermined value at a floor surface located at the site of use of the vehicle; and storing adjustment values obtained during the adjustment of the sensors in an additional adjustment table.

9. The method as defined in claim 8, further including the steps of:

electrically adjusting the sensors at the floor surface located at the site of use of the vehicle inclusive of the guideway located at the floor surface to a predetermined contrast value for facilitating the detecting of the guideway;

said contrast value, viewed over the width of the row of sensors, being determined by the division of a mean measurement value of all of the sensors and a minimal measurement value of the sensors; and the values determined by the adjustment of the sensors being stored in an additional adjustment table, said additional adjustment table being a temporary adjustment table.

10. The method as defined in claim 9, wherein:

the step of electrically adjusting the sensors to the predetermined contrast value is performed during the guiding of the row of sensors over the optical guideway.

11. The method as defined in claim 10, further including the steps of:

storing and evaluating changes in the contrast value obtained as a function of position along the optical guideway.

12. The method as defined in claim 10, further including the step of:

storing and evaluating changes in the temporary adjustment table with respect to position along the optical guideway.

13. The method as defined in claim 10, further including the step of:

storing and evaluating any change of the contrast value and any change of the temporary adjustment table with respect to position along the optical guideway.

14. The method as defined in claim 13, further including the step of:

storing and evaluating said changes in conjunction with the position of the vehicle along the optical guideway.

15. The method as defined in claim 14, further including the step of:

transmitting the stored and evaluated changes to a central display unit.

16. The method as defined in claim 14, further including the step of:

triggering a warning signal upon reaching a predetermined threshold value of the changes.

17. The method as defined in claim 13, further including the steps of:

slowing down a drive of the vehicle upon attainment of a predetermined threshold value of any one of the change of the contrast valve or the change of the adjustment table.

18. The method as defined in claim 13, further including the steps of:

shutting down a drive of the vehicle upon attainment of a predetermined threshold value of any one of the change of the contrast value or a change of the adjustment table.

19. The method as defined in claim 1, wherein:

each of said sensors comprises a transmitter and a current driver stages for initializing a light pulse transmitted from said transmitter, said method further including the steps of:

employing the values which have been stored in the adjustment table, in the step of storing said adjustment values, as a measure for the magnitude of a voltage which is to be applied to current driver stages of individual transmitters of the sensors.

20. The method as defined in claim 1, wherein:

each of said sensors comprises a receiver and an amplifier stage for amplifying an electrical signal from said receiver, said method further including the steps of:

employing the values stored in the adjustment table as a measure for the adjustment of amplifier stages correlated to receivers of the sensors.

21. The method as defined in claim 1, further including the step of:

using the values stored in the adjustment table as arithmetic magnitudes during evaluation of the measurement values for determining whether a control signal is to be transmitted to the vehicle.

22. The method as defined in claim 1, further including the steps of:

providing for each sensor a transmitter; and transmitting, by means of the transmitter, at least 5,000 infrared light pulses per second.

23. The method as defined in claim 22, wherein:

said step of transmitting by means of the transmitter of each sensor comprises transmitting approximately 10,000 light pulses per second.

* * * * *